United States Patent
Kobayashi et al.

(10) Patent No.: US 8,469,829 B2
(45) Date of Patent: Jun. 25, 2013

(54) FIXED CONSTANT VELOCITY UNIVERSAL JOINT

(75) Inventors: Masazumi Kobayashi, Iwata (JP); Kenji Yamada, Iwata (JP)

(73) Assignee: NTN Corporation, Osaka (JP)

( * ) Notice: Subject to any disclaimer, the term of this patent is extended or adjusted under 35 U.S.C. 154(b) by 334 days.

(21) Appl. No.: 12/738,380

(22) PCT Filed: Oct. 8, 2008

(86) PCT No.: PCT/JP2008/068283
§ 371 (c)(1),
(2), (4) Date: Apr. 16, 2010

(87) PCT Pub. No.: WO2009/054266
PCT Pub. Date: Apr. 30, 2009

(65) Prior Publication Data
US 2010/0234116 A1  Sep. 16, 2010

(30) Foreign Application Priority Data
Oct. 23, 2007  (JP) .................................. 2007-275355

(51) Int. Cl.
*F16D 3/224* (2011.01)

(52) U.S. Cl.
USPC ........................................ 464/145; 464/906

(58) Field of Classification Search
USPC ............................ 464/144–146, 906; 148/571
See application file for complete search history.

(56) References Cited

U.S. PATENT DOCUMENTS
7,025,685 B2 * 4/2006 Yoshida et al. ............... 464/145

FOREIGN PATENT DOCUMENTS

| JP | 63-5614 | | 9/1979 |
|---|---|---|---|
| JP | 56-065924 | * | 6/1981 |
| JP | 04-194418 | | 7/1992 |
| JP | 05-026250 | | 2/1993 |
| JP | 2000-227123 | | 8/2000 |
| JP | 2001-323945 | | 11/2001 |

OTHER PUBLICATIONS

International Preliminary Report on Patentability and Written Opinion of the International Searching Authority mailed Jun. 10, 2010 in International (PCT) Application No. PCT/JP2008/068283.
International Search Report issued Jan. 6, 2009 in International (PCT) Application No. PCT/JP2008/068283.

* cited by examiner

*Primary Examiner* — Gregory Binda
(74) *Attorney, Agent, or Firm* — Wenderoth, Lind & Ponack, L.L.P.

(57) ABSTRACT

A fixed type constant velocity universal joint includes an outer joint member including an inner surface in which a plurality of track grooves are formed, an inner joint member including an outer surface in which a plurality of track grooves are formed, a plurality of balls between the track grooves of the outer joint member and the inner joint member so as to transmit torque, and a cage having pockets for housing the balls, and being between the outer joint member and the inner joint member. At a maximum operating angle, the balls roll up to track-groove-opening-end portions of the outer joint member. Each of the track grooves of the outer joint member includes a hardened layer formed so as to extend from a track-groove deep side to the track-groove-opening-end portion, the hardened layer being thinner at the track-groove-opening-end portion compared with the other portions.

8 Claims, 8 Drawing Sheets

FIXED CONSTANT VELOCITY UNIVERSAL JOINT

BACKGROUND OF THE INVENTION

I. Technical Field

The present invention relates to a fixed type constant velocity universal joint used in automobiles or various industrial machines.

II. Description of the Related Art

Figure 4:
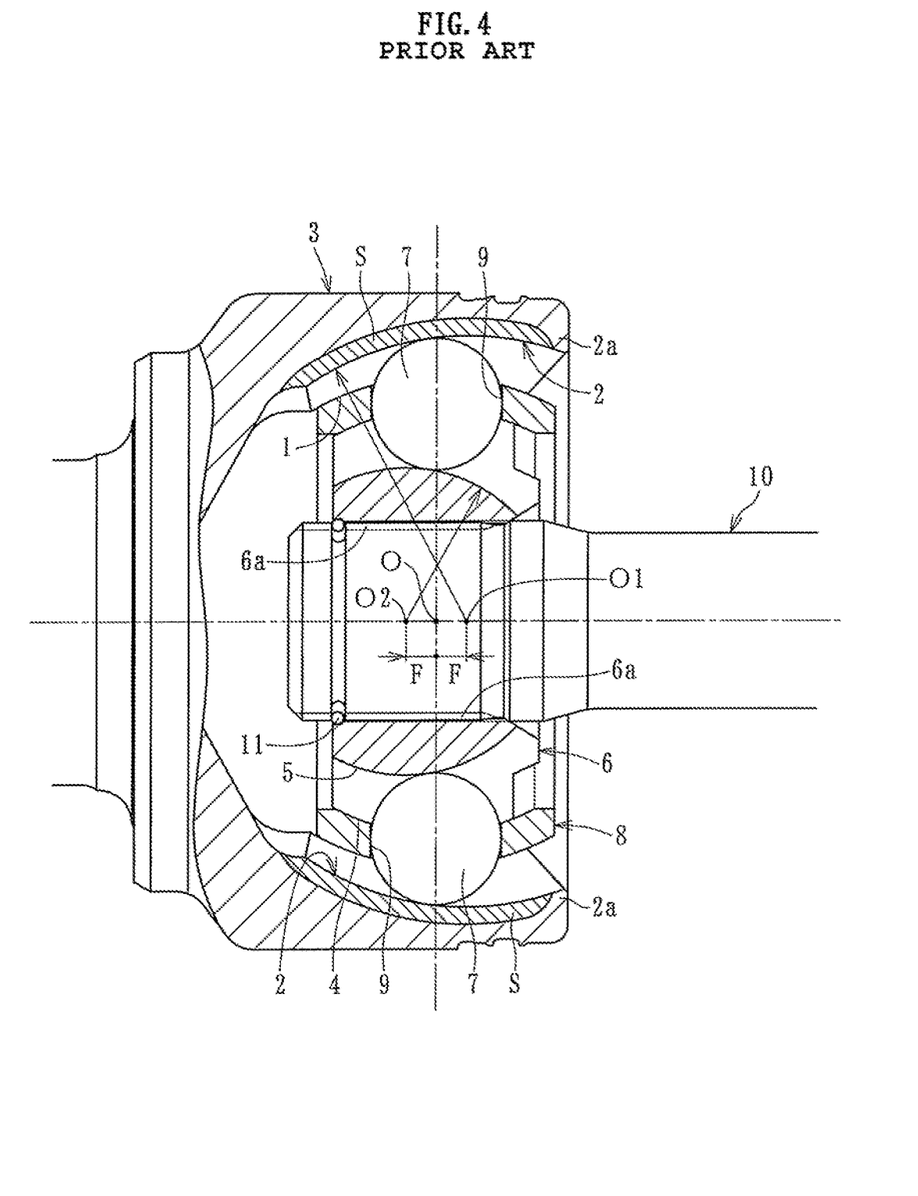
FIG. 4 is a sectional view illustrating a conventional fixed type constant velocity universal joint.

Fixed type constant velocity universal joints include joints of types such as a Rzeppa type (BJ) and an undercut-free type (UJ). As illustrated in FIG. 4, the fixed type constant velocity universal joint of the Rzeppa type (BJ) includes an outer ring 3 as an outer joint member having an inner surface 1 in which a plurality of track grooves 2 are equiangularly formed along an axial direction, an inner ring 6 as an inner joint member having an outer surface 4 in which a plurality of track grooves 5 paired with the track grooves 2 of the outer ring 3 are equiangularly formed in the axial direction, a plurality of balls 7 interposed between the track grooves 2 of the outer ring 3 and the track grooves 5 of the inner ring 6 so as to transmit torque, and a cage 8 interposed between the inner surface 1 of the outer ring 3 and the outer surface 4 of the inner ring 6 so as to retain the balls 7. In the cage 8, a plurality of pockets 9 for accommodating the balls 7 are arranged along a circumferential direction.

Further, a center of curvature O1 of the track grooves 2 of the outer ring 3 and a center of curvature O2 of the track grooves 5 of the inner ring 6 are offset with respect to a joint center O by equidistances F, F in opposite directions along the axial direction, respectively.

A shaft 10 is inserted into a center hole (inner diameter hole) 6a of the inner ring 6, and spline fitting is performed between the shaft 10 and the center hole 6a. The spline fitting allows torque to be transmitted therebetween. Note that a circular circlip 11 for preventing shaft detachment is attached onto an end portion of the shaft 10.

Figure 5:
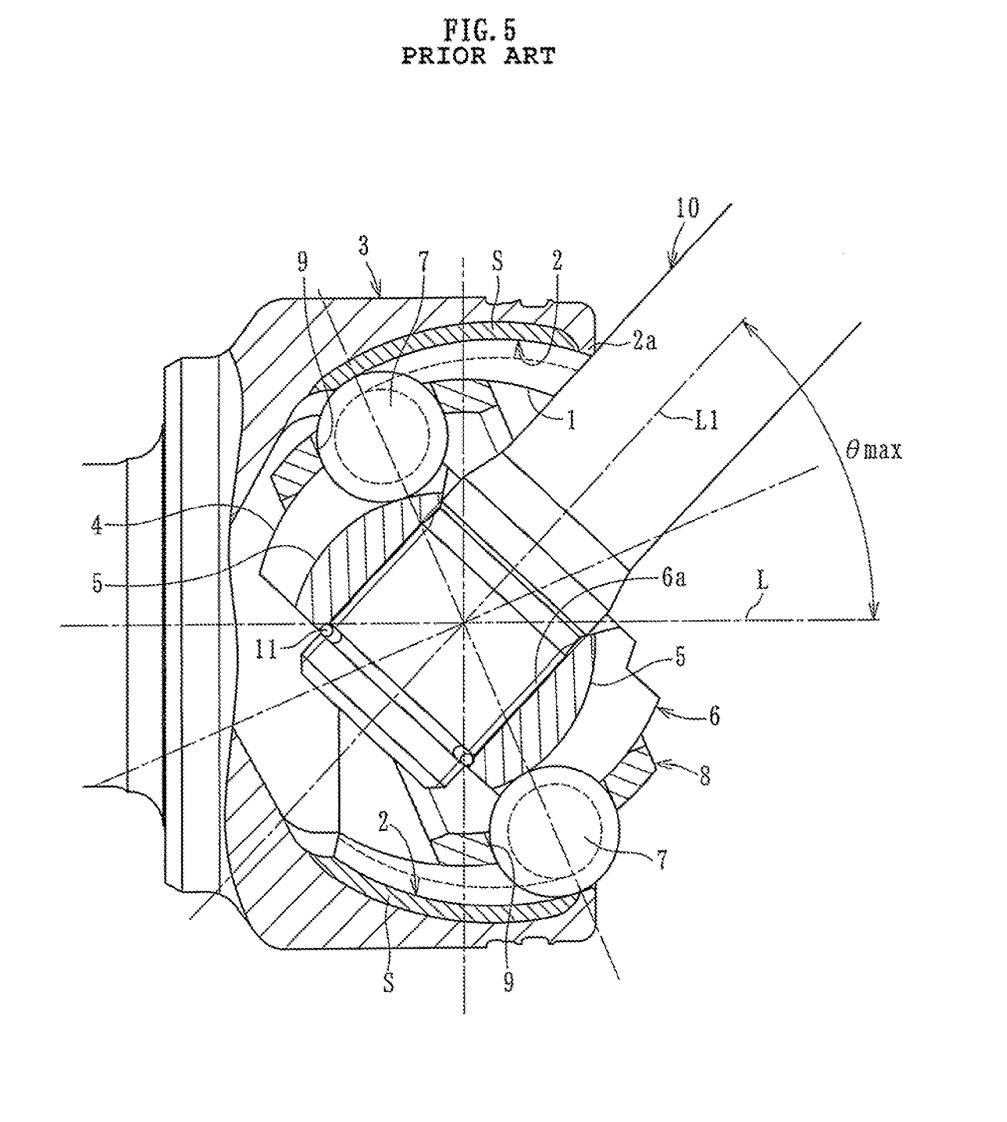
FIG. 5 is a sectional view when the fixed type constant velocity universal joint of FIG. 4 forms an operating angle.

A hardened layer S is formed in each of the track grooves 2 of the outer ring 3. In the case of forming the hardened layers S, when the number of the balls 7 is six, there is a case that the hardened layers S are not formed, as illustrated in FIG. 4, at opening end portions (Japanese Examined Patent Publication No. Sho 63-5614). The hardened layers S are not formed for the purpose of increasing fatigue strength against tension stress which is repeatedly generated in opening end portions 2a of track-groove-bottom portions of the outer ring 3 when the fixed type constant velocity universal joint transmits a rotational force while forming, as illustrated in FIG. 5, a high angle θ max (maximum angle formed between a joint axis L and an axis L1 of the shaft 10).

SUMMARY OF INVENTION

Figure 6:
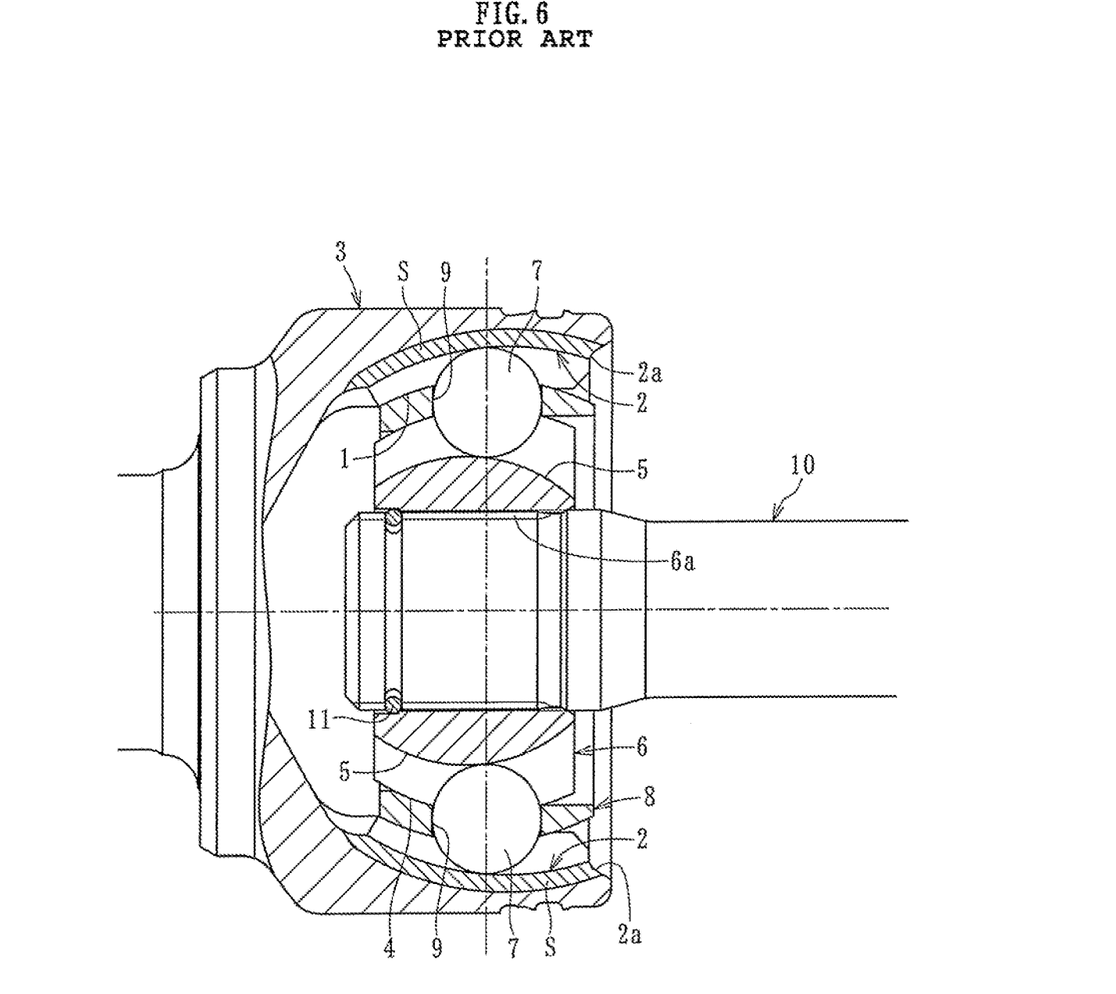
FIG. 6 is a sectional view of another conventional fixed type constant velocity universal joint.
Figure 7:
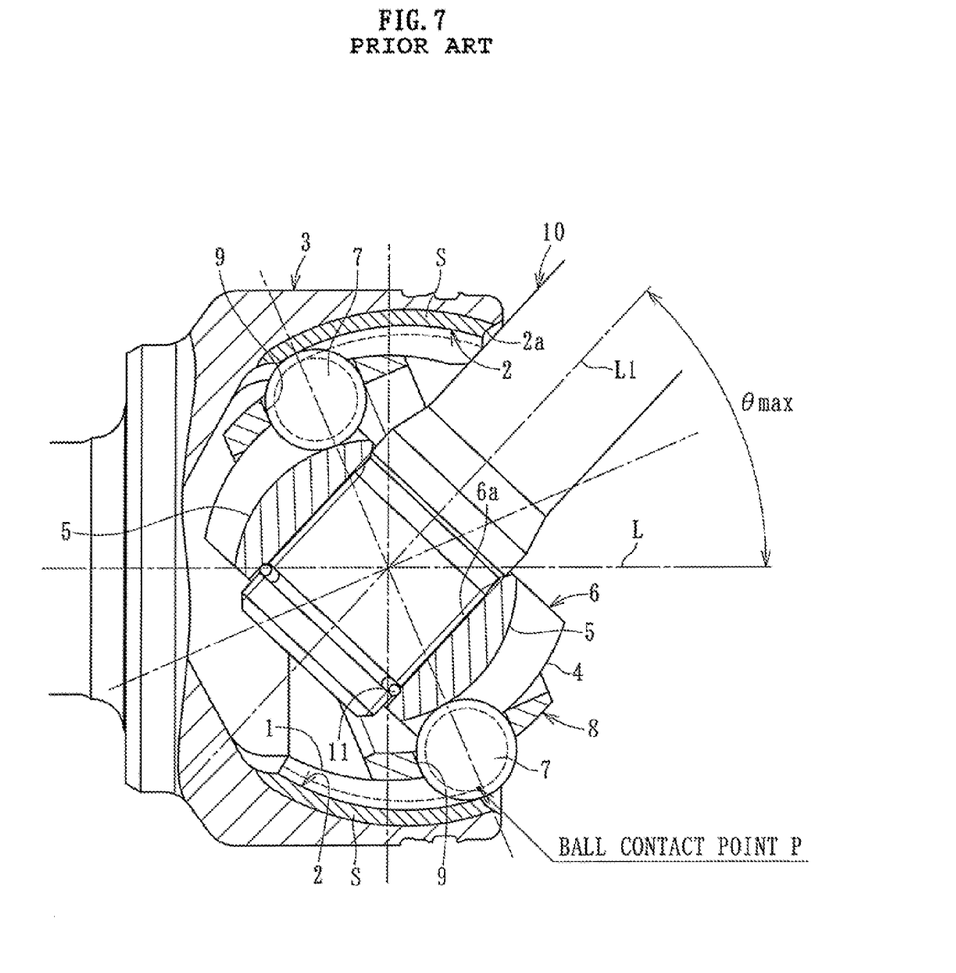
FIG. 7 is a sectional view when the fixed type constant velocity universal joint of FIG. 6 forms an operating angle.

In recent years, as illustrated in FIG. 6, the fixed type constant velocity universal joint sometimes adopts eight balls 7 for downsizing and compactification thereof. However, when the maximum operating angle θ max is formed in the case of adopting the eight balls 7, a contact point P of one of the balls 7 is positioned at a track-groove-opening-end portion 2a of the outer ring 3. Therefore, in the fixed type constant velocity universal joint provided with eight balls, the balls 7 roll to the track-groove-opening-end portions 2a, and hence the hardened layers S are required to be formed up to the opening end portions 2a of the track grooves 2. However, if the hardened layers S are formed up to the opening end portions 2a of the track grooves 2, the fatigue strength cannot stably be obtained when the fixed type constant velocity universal joint transmits a rotational force while forming a high angle.

In view of the above-mentioned problem, the present invention provides a constant velocity universal joint capable of obtaining, in every angular region, wear resistance against rolling of the balls and a stable high fatigue strength characteristic.

A fixed type constant velocity universal joint of the present invention includes: an outer joint member including an inner surface in which a plurality of track grooves are formed; an inner joint member including an outer surface in which a plurality of track grooves are formed; a plurality of balls interposed between the track grooves of the outer joint member and the track grooves of the inner joint member so as to transmit torque; and a cage, which has pockets for housing the balls, and is interposed between the outer joint member and the inner joint member, in which, when a maximum operating angle is formed, the balls roll up to track-groove-opening-end portions of the outer joint member. In the fixed type constant velocity universal joint of the present invention, each of the track grooves of the outer joint member is provided with a hardened layer formed so as to extend from a track-groove deep side to the track-groove-opening-end portion, the hardened layer having a smaller thickness at the track-groove-opening-end portion compared with that at other portions.

In the fixed type constant velocity universal joint of the present invention, the hardened layers of the track grooves of the outer joint member are formed so as to extend from the track-groove deep side to the track-groove-opening-end portion, and the hardened layers are reduced in thickness at the track-groove-opening-end portions. Therefore, even when the high angle is formed and a rotational force is transmitted while a ball contact point is positioned at the track-groove-opening-end portion of the outer ring, it is possible to obtain at high level a fatigue strength against tension stress which is repeatedly generated in the track-groove-opening-end portions. Further, even when the hardened layers are reduced in thickness at the track-groove-opening-end portions, the track-groove-opening-end portions are used less frequently than other portions, and hence there is no problem regarding wear resistance.

It is preferred that the thickness of the hardened layers at the track-groove-opening end portions be set to from 0.3 mm to 2.0 mm. When the thickness is less than 0.3 mm, sufficient wear resistance cannot be obtained in terms of its use frequency. When the thickness is over 2.0 mm, the fatigue strength of the outer joint member cannot be obtained at high level at the time of formation of the high angle. Further, it is preferred that an axial range within which the hardened layers are reduced in thickness be set to 5 mm or less. When the range is over 5 mm, the hardened layers S1 are reduced in thickness in a range in which the use frequency is high, which causes a problem in wear resistance.

The fixed type constant velocity universal joint may be Rzeppa type or the undercut-free type constant velocity universal joint. In the Rzeppa type, the track grooves of the inner joint member and the track grooves of the outer joint member are each constituted only by a circular-arc portion. In the undercut-free type, the track grooves of the inner joint member and the track grooves of the outer joint member are each constituted by a circular-arc portion and a straight portion.

In the present invention, even when the high angle is formed and a rotational force is transmitted while a ball contact point is positioned at the track-groove-opening-end portion of the outer ring, it is possible to obtain at high level a fatigue strength against tension stress which is repeatedly generated in the track-groove-opening-end portions. Further, even when the hardened layers are reduced in thickness at the track-groove-opening-end portions, there is no problem regarding wear resistance. Therefore, the fixed type constant velocity universal joint can obtain, in every angular region, wear resistance against rolling of the balls and a stable high fatigue strength characteristic. Therefore, the fixed type constant velocity universal joint can exert a highly-efficient torque transmitting function stably for a long period of time.

By setting the thickness of the hardened layers at the track-groove-opening-end portions to from 0.3 to 2.0 mm, it is possible to exert the highly-efficient torque transmitting function more stably for a long period of time. Further, by setting the range H within which the thickness is reduced to 5 mm or less, it is possible to improve reliability of the highly-efficient torque transmitting function.

The fixed type constant velocity universal joint may be the Rzeppa type or the undercut-free type, and is applicable to various uses.

DETAILED DESCRIPTION OF THE INVENTION

Hereinafter, an embodiment of the present invention is described with reference to FIGS. 1 to 3.

Figure 1A:
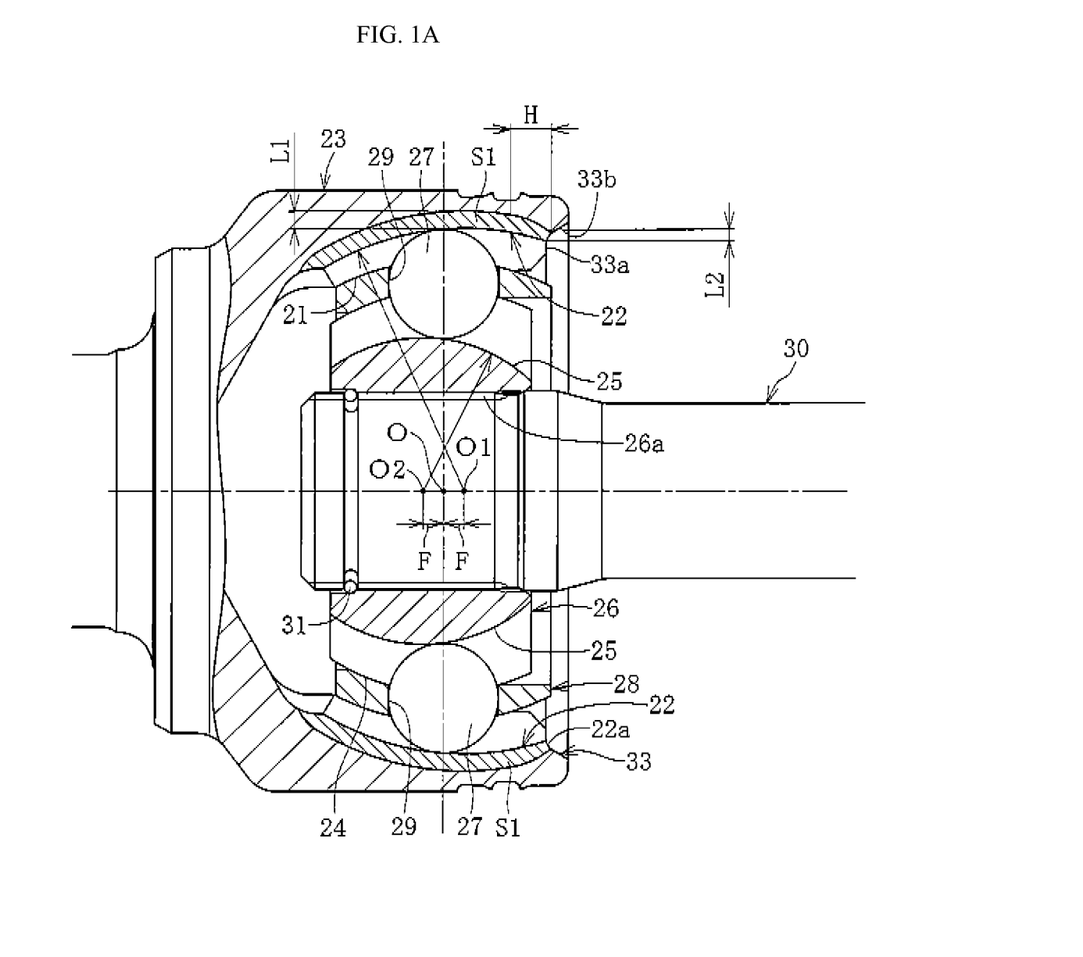
FIG. 1A is a sectional view of a fixed type constant velocity universal joint of the Rzeppa-tape (BJ-type), which illustrates an embodiment of the present invention.
Figure 2:
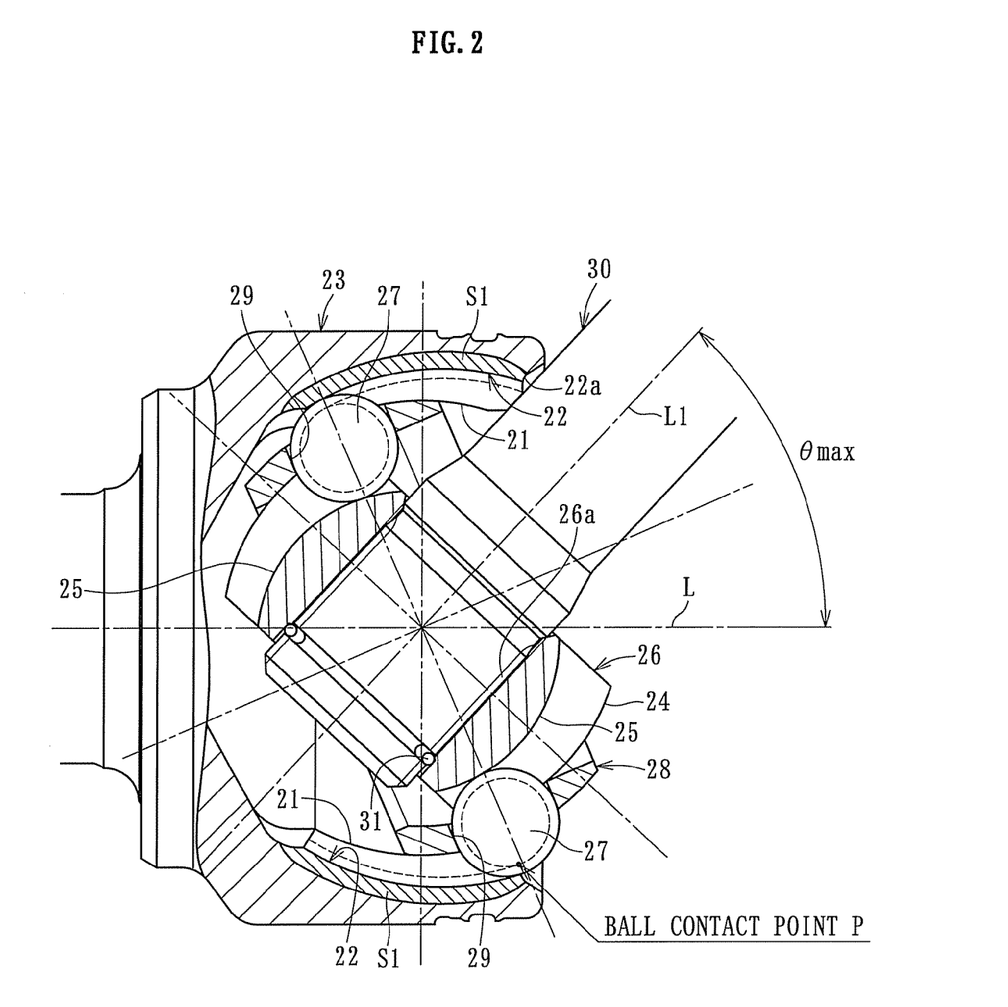
FIG. 2 is a sectional view when the fixed type constant velocity universal joint forms an operating angle.

A fixed type constant velocity universal joint according to a first embodiment illustrated in FIG. 1A is a Rzeppa type constant velocity universal joint (BJ) including an outer ring 23 serving as an outer joint member and an inner ring 26 serving as an inner joint member. The outer ring 23 has an inner surface 21 in which a plurality of track grooves 22 are formed along the axial direction thereof. The inner ring 26 has an outer surface 24 in which a plurality of track grooves 25 is formed along the axial direction thereof. Further, the track grooves 22 of the outer ring 23 and the track grooves 25 of the inner ring 26 are paired with each other, respectively, and each of the balls 27 for transmitting torque is interposed between the track groove 22 of the outer ring 23 and the track groove 25 of the inner ring 26. A cage 28 is interposed between the inner surface 21 of the outer ring 23 and the outer surface 24 of the inner ring 26, and the balls 27 are respectively retained in a plurality of pockets (window portions) 29 arranged by predetermined pitches along the circumferential direction of the cage 28.

In the track grooves 22 of the outer ring 23, a center of curvature O1 is shifted from a joint center O in the axial direction toward the opening side of the outer ring 23. Further, a center of curvature O2 of the track grooves 25 of the inner ring 26 is shifted from the joint center O in the axial direction toward a deep side, which is opposite to the center of curvature O1 of the track grooves 22 of the outer ring 23, by an equidistance F equal to the distance from the joint center O to the center of curvature O1. A notch portion 33 is formed in the opening end portion of the outer ring 23. The notch portion 33 includes an inner-side notch portion 33a extending in the radial direction and a tapered portion 33b increasing its diameter from the radially-outer end of the inner-side notch portion 33a to the outer side.

A shaft 30 is inserted into a center hole (inner diameter hole) 26a of the inner ring 26, and spline fitting is performed between the shaft 30 and the center hole 26a. The spline fitting allows torque to be transmitted therebetween. A circular circlip 31 for preventing shaft detachment is attached onto an end portion of the shaft 30.

A hardened layer S1 is formed in each of the track grooves 22 of the outer ring 23. The hardened layers S1 are formed so as to extend from deep side of the grooves to the groove-opening-end portions 22a. For the hardened layers S1, heat treatment such as induction hardening may be adopted. Here, the induction hardening is a hardening method applying a principle of heating, after inserting a portion required to be hardened into a coil through which a high-frequency current flows, a conductive substance by Joule heat generated by an electromagnetic induction action.

In the hardened layers S1, the thickness at the track-groove-opening-end portions 22a are smaller than that of other portions thereof. That is, when the thickness of the hardened layers at the track-groove-opening-end portions 22a is represented by L2 and the thickness of the hardened layers at other portions is represented by L1, L2<L1 is established. L2 is, for example, set to approximately from 0.3 to 2.0 mm. In contrast, generally, L1 is set to a thickness substantially equal to the thickness of the hardened layers formed in the track grooves of the outer ring of the constant velocity universal joint of this type, that is, set to approximately from 1 to 4 mm, L1 being substantially constant along the axial direction.

Further, the thickness of the hardened layers S1 is gradually decreased from the deep side in the vicinity of the track groove-opening-end portions 22a toward the outer side. For example, the range H within which the thickness is reduced is set to approximately 5 mm or less.

The hardened layers S1 of the track grooves 22 of the outer ring 23 are formed so as to extend from deep side of the track grooves to the track-groove-opening-end portions 22a, and the thickness thereof is reduced at the track-groove-opening-end portions 22a. Therefore, even when a maximum high angle θ max (maximum angle formed between a joint axis L and an axis L1 of the shaft 30) is formed as illustrated in FIG. 2 and a rotational force is transmitted while a contact point P of one of the balls 27 is positioned at the track-groove-opening-end portion 22a of the outer ring 23, it is possible to obtain at high level a fatigue strength against tension stress which is repeatedly generated in the track-groove-opening-end portions 22a. Further, even when the hardened layers S1 are reduced in thickness at the track-groove-opening-end portions 22a, the track-groove-opening-end portions 22a are used less frequently than other portions, and hence there is no problem regarding wear resistance. Therefore, the constant velocity universal joint can obtain, in every angular region, wear resistance against rolling of the balls 27 and a stable high fatigue strength characteristic. Therefore, the constant velocity universal joint can exert a highly-efficient torque transmitting function stably for a long period of time.

In particular, by setting the thickness of the hardened layers at the track-groove-opening-end portions to from 0.3 to 2.0 mm, it is possible to exert the highly-efficient torque transmitting function more stably for a long period of time. That is, when the thickness is less than 0.3 mm, sufficient wear resistance cannot be obtained due to its use frequency. When the thickness is over 2.0 mm, the fatigue strength of the outer joint member cannot be obtained at high level when the high angle is formed.

Further, by setting the range H within which the thickness is reduced to 5 mm or less, it is possible to improve reliability of the highly-efficient torque transmitting function. When the range is over 5 mm, the hardened layers S1 are reduced in thickness in a range in which the use frequency is high, which causes a problem in wear resistance.

Figure 1B:
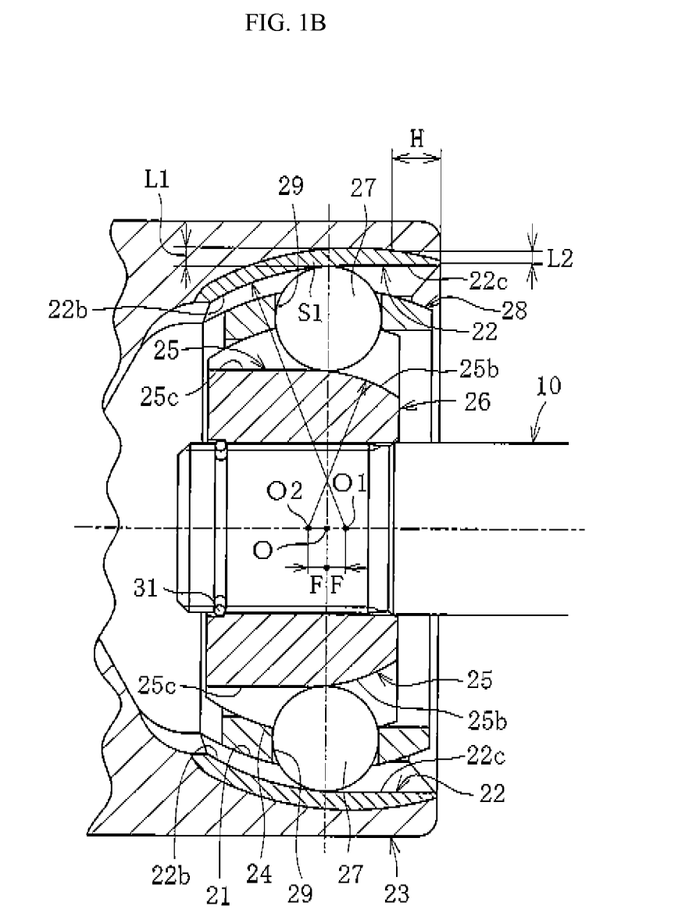
FIG. 1B is a sectional view of a fixed type constant velocity universal joint of the undercut-free type (UJ-type), which illustrates an embodiment of the present invention.

Though, in FIG. 1A, a Rzeppa type constant velocity universal joint in which the track grooves 22, 25 are constituted merely by a circular-arc portion is adopted as the constant velocity universal joint, an undercut-free type constant velocity universal joint, an undercut-free type constant velocity universal joint in which the track grooves 22, 25 are constituted by the circular-arc portion 22b, 25b and a straight portion 22c, 25c can also be adopted as shown in FIG. 1B. When the undercut-free type constant velocity universal joint is adopted, it is possible to realize a higher operating angle. Of course, the hardened layers S1 and the like are also provided in the undercut-free type constant velocity universal joint as in the Rzeppa type constant velocity universal joint shown in FIG. 1A. In other words, within the hardened layers S1, the portions outside of the track-groove-opening-end portions are set as a range in which the use frequency is high, and the track-groove-opening-end portions are set as a range in which the use frequency is low. Further, the thickness of the hardened layers in the range in which the use frequency is high is set to 4 mm or less, and the thickness of the hardened layers in the range in which the use frequency is low is set to 0.3 mm to 2.0 mm. Also, the thickness in the hardened layers at the track-groove-opening-end portions is set to be smaller compared to the thickness in other portions, and an axial range within which the hardened layer has the smaller thickness is set to a range larger than 0 mm and 5 mm or less. Thereby, the same operational effects as those achieved by the Rzeppa type constant velocity universal joint shown in FIG. 1A can be achieved by the undercut-free type constant velocity universal joint shown in FIG. 1B.

Further, the number of the balls may be three or more. In particular, according to the constant velocity universal joint including eight or more torque transmitting balls, it is possible to achieve further compactification and weight reduction while ensuring a strength, load capacity, and durability.

Though the embodiment of the present invention is described above, the present invention is not limited to the above-mentioned embodiment. It is needless to say that the present invention can be made according to various embodiments within a scope not departing from the gist of the present invention. The scope of the present invention is indicated by "CLAIMS", and encompasses the meanings equivalent to the meanings described in "CLAIMS", and all contents described in "CLAIMS".

Example

Figure 3:
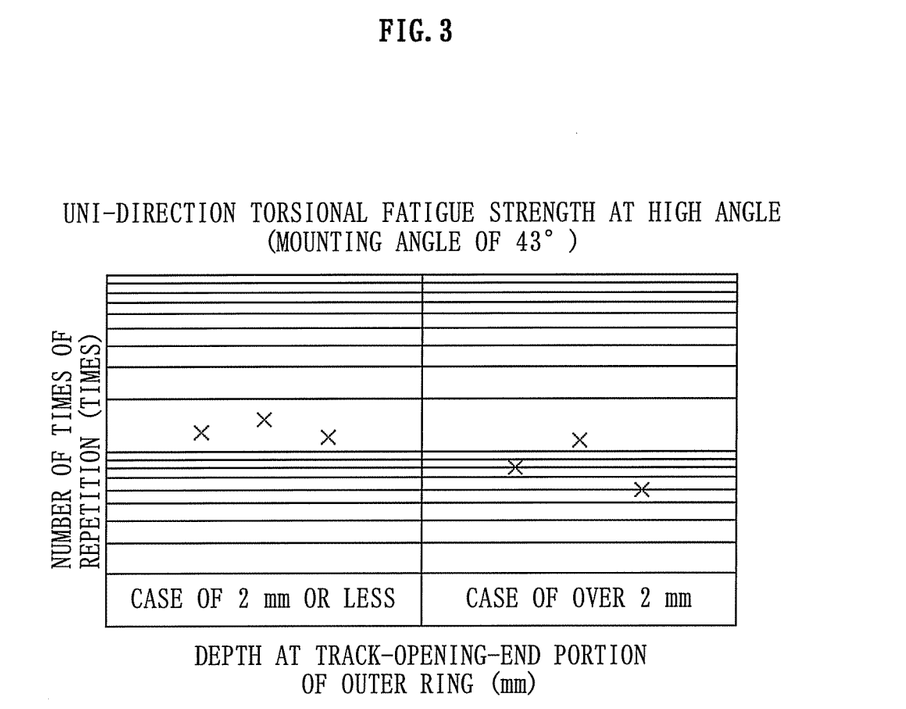
FIG. 3 is a graph showing a relationship between hardened layers and a fatigue strength.

Examination was made of the relationship between the depth (thickness) of the hardened layers at the opening end portions of the track grooves of the outer ring 23 and a uni-direction torsional fatigue strength at high angle (mounting angle of 43°), and results of the examination are shown in FIG. 3. This graph shows that, when the thickness (depth) of the hardened layers at the opening end portions is 2 mm or less, the uni-direction torsional fatigue strength at high angle is stably high compared with the case of over 2 mm. Note that, in FIG. 3, the mounting angle means an angle (operating angle) formed between the joint axis L and the shaft axis L1, and the angle is set to 43° in FIG. 3.

The present invention is applicable to a constant velocity universal joint of a type capable of forming a high operating angle (for example, a Rzeppa type, a Birfield type, and the like, which use balls). Further, the number of the balls may be a range from three to eight.

The invention claimed is:

1. A fixed constant velocity universal joint, comprising:
   an outer joint member comprising an inner surface in which a plurality of track grooves are disposed, each track groove of the plurality of track grooves having a track-groove-opening-end portion;
   an inner joint member comprising an outer surface in which a plurality of track grooves are disposed;
   a plurality of balls interposed between the track grooves of the outer joint member and the track grooves of the inner joint member so as to transmit torque; and
   a cage comprising pockets configured to house the balls, and being interposed between the outer joint member and the inner joint member,
   wherein, the plurality of balls are configured and arranged such that at a maximum operating angle of the fixed constant velocity universal joint, the balls roll up to the track-groove-opening-end portions of the outer joint member, and
   wherein each track groove of the plurality of track grooves of the outer joint member includes a hardened layer extending from a track-groove deep side to the track-groove-opening-end portion,
   each ball of the plurality of balls is configured and arranged in a respective track groove of the plurality of track grooves of the outer joint member to, at the hardened layer, travel along the track-groove-opening-end portion of the respective track groove within a first range and travel along a portion other than the track-groove-opening-end portion of the respective track groove within a second range, and being configured and arranged such that a frequency at which the ball travels along the first range is less than a frequency at which the ball travels along the second range,
   for each track groove of the plurality of track grooves of the outer joint member, a thickness of the second range is 4 mm or less and greater than 0 mm,
   for each track groove of the plurality of track grooves of the outer joint member, a thickness of the first range is 0.3 mm to 2.0 mm, and
   for each track groove of the plurality of track grooves of the outer joint member, the track-groove-opening-end portion of the hardened layer has a thickness that is less than a thickness at other portions thereof.

2. A fixed constant velocity universal joint according to claim 1, wherein the thickness of the track-groove-opening-end portion of the hardened layer has an axial range of 5 mm or less and greater than 0 mm.

3. A fixed constant velocity universal joint according to claim 2, wherein the fixed constant velocity universal joint is a Rzeppa constant velocity universal joint in which the track grooves of the inner joint member and the track grooves of the outer joint member each only include a circular-arc portion.

4. A fixed constant velocity universal joint according to claim 2, wherein the fixed constant velocity universal joint is an undercut-free constant velocity universal joint in which the track grooves of the inner joint member and the track grooves of the outer joint member each include a circular-arc portion and a straight portion.

5. A fixed constant velocity universal joint according to claim 2, wherein the balls comprise three to eight balls.

6. A fixed constant velocity universal joint according to claim 1, wherein the fixed constant velocity universal joint is a Rzeppa constant velocity universal joint in which the track grooves of the inner joint member and the track grooves of the outer joint member each only include a circular-arc portion.

7. A fixed constant velocity universal joint according to claim 1, wherein the fixed constant velocity universal joint is an undercut-free constant velocity universal joint in which the track grooves of the inner joint member and the track grooves of the outer joint member each include a circular-arc portion and a straight portion.

8. A fixed constant velocity universal joint according to claim 1, wherein the balls comprise three to eight balls.

* * * * *